Oct. 29, 1963 A. CHAUSSON 3,108,559
DEVICE FOR SOLDERING VARIOUS PARTS
Filed March 1, 1960 7 Sheets-Sheet 1

INVENTOR
ANDRÉ CHAUSSON
Att'ys.

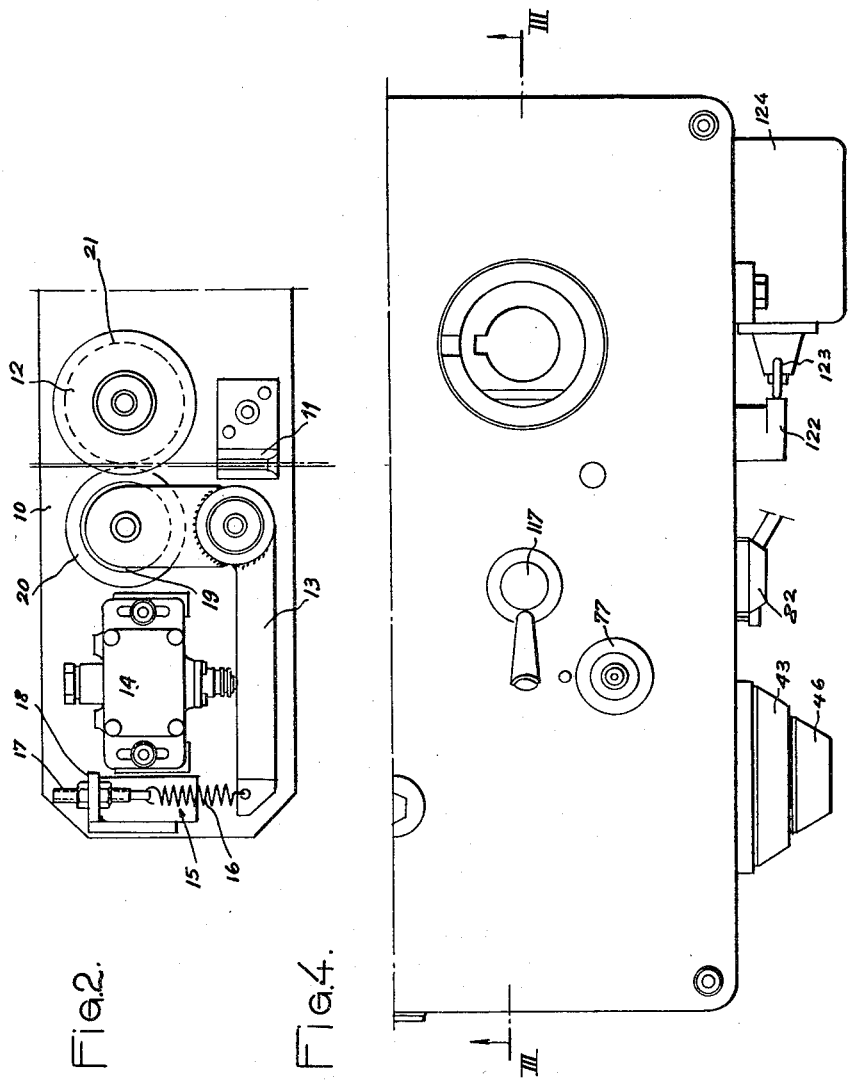

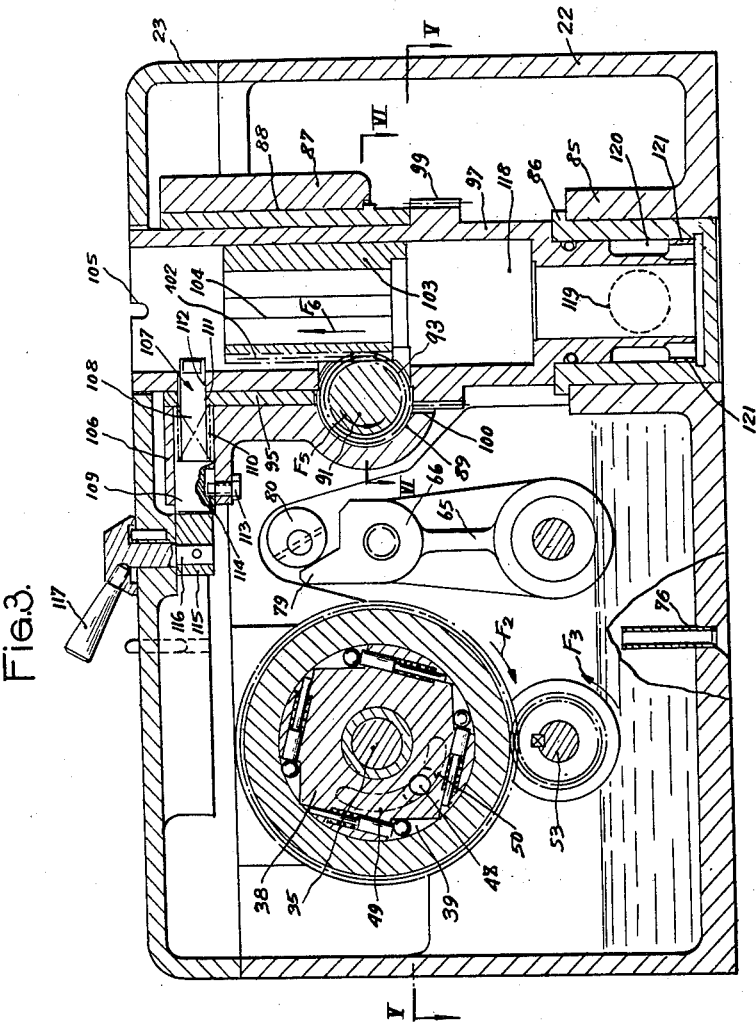

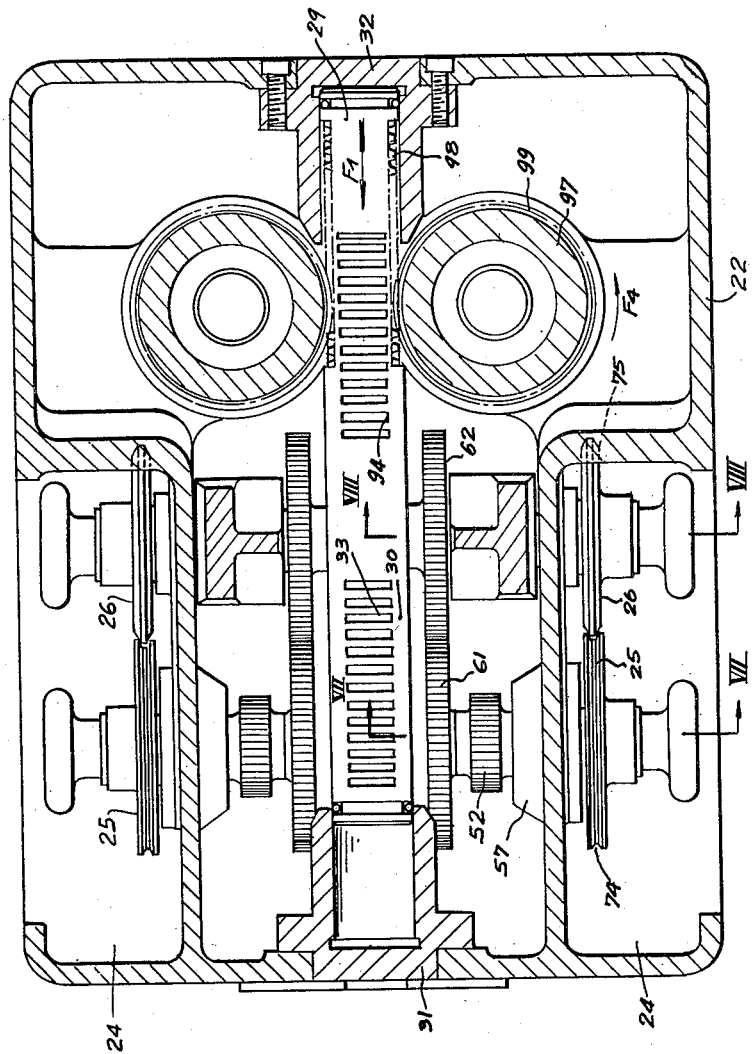

Oct. 29, 1963  A. CHAUSSON  3,108,559
DEVICE FOR SOLDERING VARIOUS PARTS
Filed March 1, 1960  7 Sheets-Sheet 5
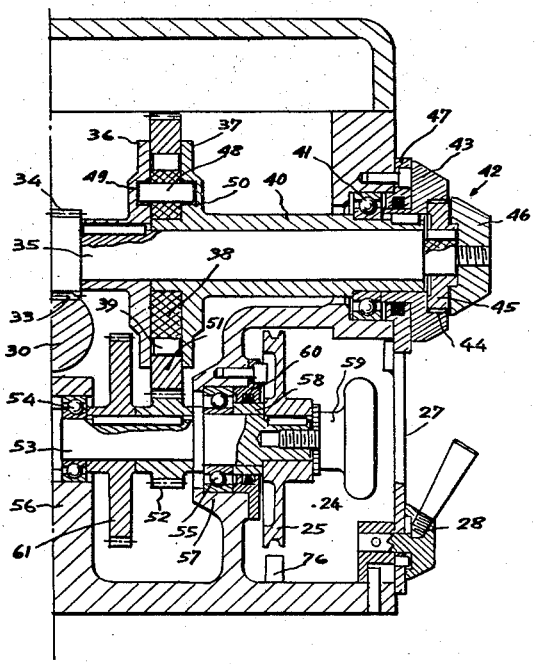
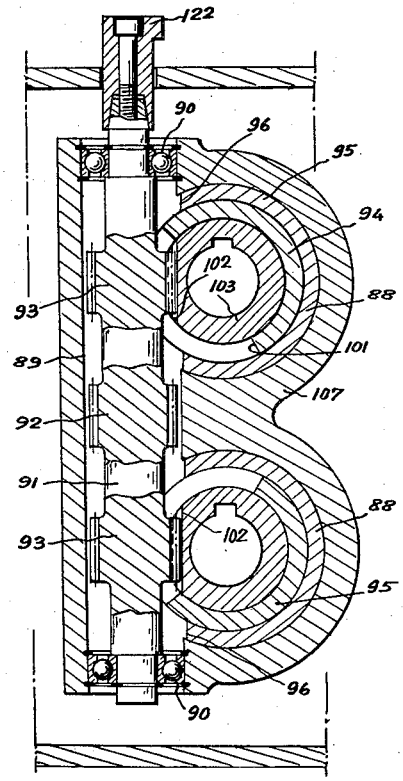
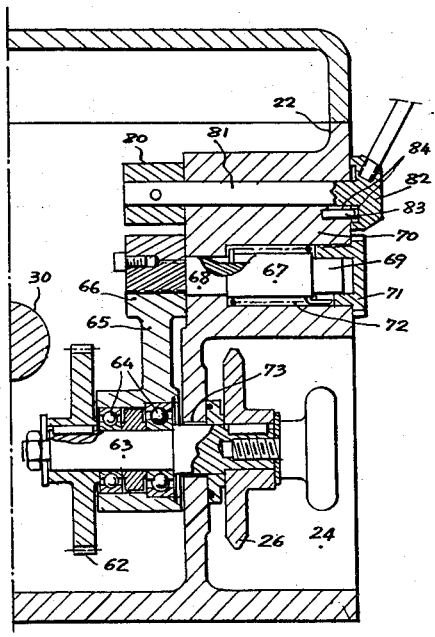
INVENTOR
ANDRÉ CHAUSSON Oct. 29, 1963  A. CHAUSSON  3,108,559
DEVICE FOR SOLDERING VARIOUS PARTS
Filed March 1, 1960  7 Sheets-Sheet 6

INVENTOR
ANDRÉ CHAUSSON

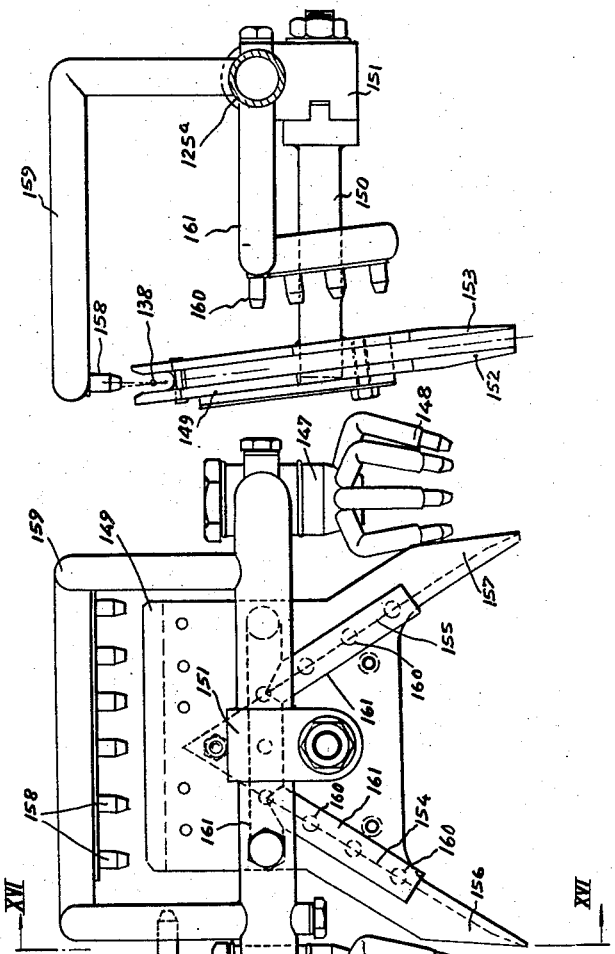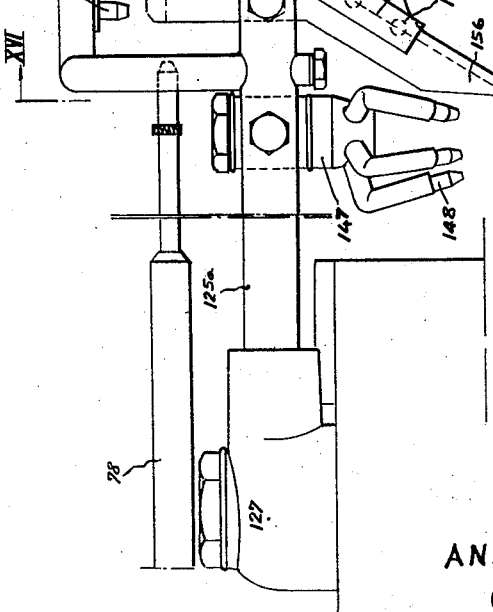

3,108,559
DEVICE FOR SOLDERING VARIOUS PARTS
André Chausson, Asnieres, France, assignor to Societe Anonyme des Usines Chausson, Asnieres, France, a company of France
Filed Mar. 1, 1960, Ser. No. 12,139
Claims priority, application France Mar. 2, 1959
4 Claims. (Cl. 113—94)

The invention relates to a device for soldering various parts. This device enables a given quantity of solder to be automatically deposited on the parts, so that soldering duration is reduced to the time corresponding to that required for melting the finishing material.

This device is particularly advantageous for effecting soft solders applied to mass production such as that of radiators.

According to the invention, the device for soldering various parts is characterised in that it comprises at least one set of distributing milled wheels for conveying the finishing material effecting soldering, these milled wheels being rotatively driven to a given extent from a motor member by means of a coupling with variable ratio whose adjustment determines the quantity of material conveyed to the work part and this material being heat treated by at least one heating element whose putting into operation is governed by the movement of said motor member, so that said conveying of the finishing material and its heat treatment take place in a time relation.

Various other characteristics of the invention will moreover be revealed by the detailed description which follows.

Forms of embodiment are shown, by way of non-restrictive examples, in the attached drawings.

FIGURE 2 is a side elevation, on a larger scale, of an accessory shown at II—II in FIGURE 1.

FIGURE 3 is a longitudinal sectional elevation, on a larger scale, taken along the line III—III of FIGURE 4, showing the driving members of the device.

FIGURE 4 is a semi-plane view corresponding to FIGURE 3.

FIGURE 5 is a section taken along the line V—V of FIGURE 3.

FIGURE 6 is a partial section taken along the line VI—VI of FIGURE 3.

FIGURES 7 and 8 are half cross-sections taken respectively along the lines VII—VII and VIII—VIII of FIGURE 5.

FIGURE 15 is an elevation shown in the direction of the arrow $f_{15}$ of FIGURE 12.

FIGURE 16 is a cross-section taken along the line XVI—XVI of FIGURE 15.

Figure 1:
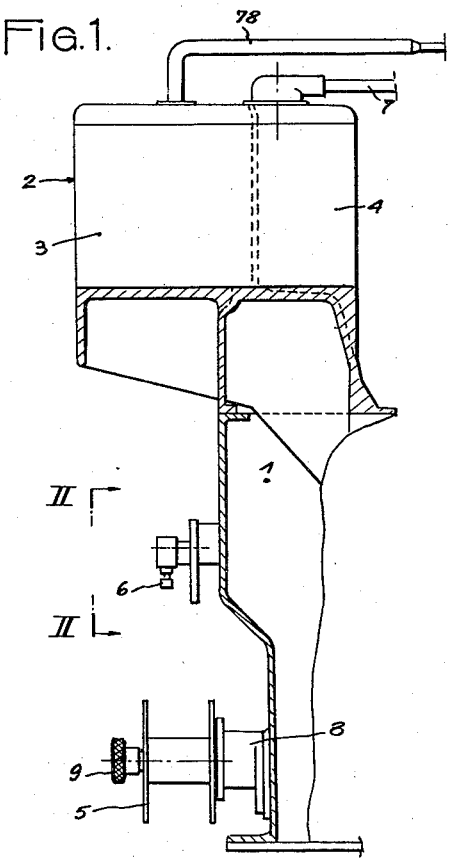
FIGURE 1 is an elevation of the complete device according to the invention.

The soldering device is supported by the frame 1 of a machine (FIGURE 1) and consists essentially of a motor unit 2 comprising a solder wire distributor 3 and a synchronous control device 4, by a wire reel 5 and a detector 6 of the end of this wire supported by the frame 1 and by a mobile heating mechanism 7 connected to the driving device 4.

The reel 5, keyed on to a spindle (not shown) mounted to revolve in a support 8, is locked on this spindle by means of a milled knob 9. The unit 2, shown in FIGURES 3 to 8, comprises two distributing sets, but it can be easily understood that this unit can be provided for as many sets as are required, each set being fed by a reel 5 controlled by a detector 6. Tin solder wire is wound on each reel, for the device shown is planned to enable the achieving of soft solderings intended to assemble the various elements of a radiator. It will easily be understood that this particular application is not restrictive and that the invention applies to the soldering of other parts or other methods of soldering by melting: solder-brazing, brazing—of metal alloys, by means of flames, electric resistances—hot air soldering of plastic materials, etc.

FIGURE 2 shows a detector 6 of the end of the wire comprising a plate 10 supporting a guiding draw-plate 11, a roller 12, a pivoting angle-iron 13, an electric contact-piece 14 and an adjustable tension elastic member 15. This latter member is formed of a draw-spring 16 fixed on a threaded gudgeon-pin 17 able to be moved in relation to a lug 18 integral with the plate 10. The free end of the spring 16 is hooked on to one of the arms of the pivoting angle-iron 13, this arm being placed opposite the contact-piece 14 so as to actuate it.

The other arm of the angle-iron 13 is provided with a roller 19 forming a flange 20 at its periphery, tending, under the action of the spring 16, to penetrate into a groove 21 cut in the roller 12. The rollers 12 and 19 and the angle-iron 13 are mounted on ball bearings so as to be able to revolve and pivot freely. The solder wire guided by the draw-plate 11 is seized between the two rollers 12 and 19 which rotatively drive it when it is pulled by the corresponding distributor 3 to the unit 2. When there is no more wire, the flange 20 of the roller 19 penetrates into the groove 21 of the roller 12 under the action of the spring 16, so that the angle-iron 13 pivots and actuates the contact-piece 14. The latter closes an electric supply circuit of a light or sound signal or the like and/or opens that of the machine on which this device is fitted so as to cause this machine to stop.

The unit 2 (FIGURES 3 to 8) comprises an impervious casing 22 closed at the top by a lid 23. The lateral walls of this casing delimit two cavities 24 (FIGURE 5) in each of which are two milled wheels 25 and 26 for carrying along the solder wire, these cavities being imperviously isolated from the internal cavity of the casing containing lubricating oil. Small inspection ports 27 provided with locks 28 are fitted on the casing 22 to seal off the cavities 24.

The unit shown comprises two distributing sets 3 each synchronized with a driving device 4 of a mobile heating mechanism; the description which follows relates to one of these sets, the other being symmetrical to that described. The single driving member of these two sets is formed by a double-acting hydraulic jack 29 placed longitudinally in the casing. This jack comprises a slidably mounted piston 30, sliding by its two ends in cylinders 31 and 32, of bronze, for example, extended in the casing to receive oil under pressure respectively from one or other side of the jack.

A rack 33 is cut in the top part of the piston 30 for rotatively driving milled wheels 25 and 26. To this end, a pinion 34 (FIGURE 7) meshing with the rack 33 projects from the middle part of a shaft 35 supporting two plates 36 and 37 intended to transmit only part of the rotation of the shaft 35 to the hub 38 of a free wheel 39. The plate 36 is keyed on the shaft 35, whereas the plate 37, integral with a bushing 40 is rotatably mounted on the shaft 35 and is supported by ball bearings 41. Further the bushing 40 is connected to said shaft 35 by means of a chocking or adjusting device 42. This device comprises a ring 43 keyed on to the bushing 40 and coupled, by means of a channeling 44 to a thick washer 45 slidably keyed on to the shaft 35 and held on the latter by means of a nut 46. A protecting hood 47 is threaded on to the ring 43 and interposed between the latter and the casing 22. In that condition it is possible to adjust the angular position of the bushing 40 with respect to the shaft 35 by dismounting the nut 46 then the washer 45 thus allowing the rotation of the bushing 40 with respect to the shaft 35, by rotating the ring 43. After such adjustment the washer 45 is again inserted and maintained by the nut 46.

Moreover, the hub 38, mounted to be rotated on the bushing 40, is traversed by a spindle 48 whose ends penetrate into partial circular grooves 49 and 50 respectively provided in the plates 36 and 37 (FIGURES 3 and 7). When the chocking or adjusting device 42 is suitably adjusted, the plates 36 and 37 are connected to the driving shaft 35 to partially transmit the rotation of the latter to the hub 38. It is to be seen that the spindle 48 cannot be driven by one of the plates, until engaged by the bottom of the grooves 49 and 50, and that spindle 48 is being driven in one direction by one of the plates and in the other direction by the other plate. In other words, when the piston 30 is moved in one direction pinion 34 and shaft 35 rotate thus causing, when the spindle 48 is engaged by the bottom of the groove 49 of the plate 36, rotation to a given extent of the hub 38, then, during moving of the piston 30 in the reverse direction, said hub 38 also is driven in the reverse direction by the intermediary of the plate 37 when the bottom of the groove 50 engages spindle 48. By modifying the angular position of the washer 45 in relation to the ring 43, the actuating ends of the grooves 49 and 50 are staggered, so that the distance is changed between these ends, and hence, the rate to which the amplitude of movement of the shaft 35 is transmitted to the hub 38. Consequently, these plates cooperating with the chocking device 42 provide a means of regulating the length of the wire distributed.

The free wheel mechanism 39, comprising cylindrical bearings carried in triangular slots, see FIG. 3, is intended to be connected to drive toothed crown-wheel 51, carried by said free-wheel and which meshes with a pinion 52 keyed onto a driving shaft 53, in only one direction. This shaft is maintained by two sets of ball bearings 54 and 55 mounted respectively in a middle plummer-block 56 of the casing and in a boss 57 projecting from the inner face of the corresponding side wall of this casing. The milled wheel 25, slidably mounted on the end of the driving shaft 53 emerging in the cavity 24, is locked, by means of a strut 58, on the inner race of the ball bearing 55 by means of a screw 59 accessible to the operator when the inspection port 27 is raised, an impervious protecting hood 60, threaded on to the strut 58 being fixed by any suitable means on to the boss 57. Moreover, a gear 61, keyed on to the driving shaft 53, is interposed between the pinion 52 and the inner race of the ball bearing 54.

As can be more particularly seen in FIGURES 5 and 8, another gear 62 engaging in certain conditions only with the gear 61, is keyed on to a shaft 63 which is maintained by means of ball bearings 64, by a rocker 65 linked on to the casing and subjected to the action of an elastic member tending to couple up the two gears. For this, the head 66 of this rocker is screwed and locked on to the threaded end of a shaft 67 whose bearings 68 and 69 are revolvably mounted respectively in a boss 70 of the casing 22 and in a threaded plug 71 screwed into this boss. The ends of a helical spring 72, threaded on to the shaft 67, are made integral with the latter and the plug so that this spring effecting a pull exerts a recoil torque on the rocker 65.

The extension of the shaft 63, traversing an arched slot 73 made in the side wall of the casing is integralized with the milled wheel 26 by any suitable means, the same, for example, as that of the milled wheel 25. The milled wheels 25 and 26 are complementarily shaped at their periphery for holding and driving the solder wire when the gears 61 and 62 are engaged. In the example shown, a trapezoidal groove 74 is cut in the middle wheel 25, whereas a double chamfer 75 is made in the periphery of the milled wheel 26. To change these milled wheels when they are worn out, or to replace them, either by milled wheels for driving a wire of a different diameter, or by multi-groove milled driving wheels for carrying several solder wires of the same length, the operator removes the inspection port 27, takes out the screw 59 locking the milled wheels and takes out the latter, the reverse operation being carried out for putting a new set of milled wheels in position.

The wire coming from the reel 5 is guided by a tube 76 (FIGURES 3 and 7) emerging into the cavity 24 level with the tangency point of the milled wheels. At each cycle, the latter carry along a suitable length of this wire which traverses an exit nozzle 77 (FIGURE 4), attached to the lid 23, a tubular distributing guide 78 (FIGURE 1) being fitted to this nozzle for conveying the wire to the required point. It is quite obvious that the wire coming from the milled wheels is quite rectilinear, because the latter, of the same original diameter, are strictly driven at the same rotation speed by means of the gears 61 and 62.

To introduce the wire between the milled wheels, it is necessary to separate them by causing the rocker 65 to pivot. To this end, the head 66 of this rocker has a tooth 79 projecting from its upper part tangent to an eccentric 80 shown in the resting position in FIGURE 3. This eccentric is pinned to a rod 81 guided in the boss 70 and externally provided with a small lever 82 whose pivoting is limited by a spur 83, integral with this boss, projecting in a groove 84 partially circular cut, in the foot of this small lever. By operating the latter so as to cause the eccentric 80 to pivot so that it thrusts the tooth 79 of the rocker against the action of the spring 72, the pivoting of said rocker takes place and the gears 61 and 62 are taken apart. In the completely retracted position, the rocker can be returned by the spring 72, because the retaining action of the eccentric 80 on the tooth 79 is normal to the latter.

Furthermore, the piston 30 actuates the synchronous control devices 4 of the heating mechanism 7 in the following manner:

The bottom of the casing 22 has two tubular bushings 85 projecting, each surrounding a blind bearing 86 corresponding to one of the devices 4. Furthermore, the casing 22 is integral, at its upper part, with a support 87 delimiting, on the one hand, two parallel bores 88, respectively axed on the bearings 86, and on the other, a bore 89 orthogonal to the two preceding ones (FIGURES 3 and 6). Ball bearings 90 are mounted in the ends of the bore 89 to maintain a counter-shaft 91, on which, at the middle part, a driving pinion 92 is cut, and, opposite the axis of the bores 88, two driven pinions 93. The support 87 is hollowed out opposite to the pinion 92 so that the latter can mesh with a rack 94 cut in the upper part of the piston 30.

Anti-friction alloy bearings 95 are tightly fitted into the bores 88 of the support 87, these bearings being cut at 96 close to the bore 89 in order to allow the passage of the pinions 93. The bearings 86 and 95 are intended to support and guide tubular parts 97 rotatively driven by lateral racks 98 of the piston 30 meshing with teeth 99 cut in these parts (FIGURES 3 and 5). Housings 100 are delimited by the support 87 for positioning the teeth 99 of parts 97 in which, furthermore, hollows 101 (FIGURES 3 and 6) are made, affording passage for pinions 93 during the pivoting of these parts.

The driven pinions 93 engage with a rack 102 cut in two sliding bushings 103 each mounted in a tubular part 97. A keying groove 104 and a notch 105 are made respectively in the bushing 103 at the top part of the part 97. During its sliding, the piston 30 causes, on the one hand, the pivoting of the parts 97, because the teeth 99 of the latter mesh with the racks 98 of the piston, and on the other hand, the alternating vertical displacement of the bushings 103, because the racks 102 of the latter are engaged with the pinions 93 rotatively driven by the pinion 92 which meshes with the rack 94 of said piston. Consequently, if each heating mechanism 7 is made integral with a part 97, it pivots around a vertical axis, but if this mechanism is made integral with a sliding bushing, it moves vertically.

Moreover, the support 87 delimits two bosses 106 at the top part, placed facing the bores 88 to guide bolts 107 securing heating mechanisms 7. Each bolt is made of a rod 108 extended by ahead 109 thrust by a spring 110 interposed between this head and the corresponding bearing 95, the rod 108 being engaged in a hole 111 and a slot 112 respectively made in the bearing 95 and the part 97. A screw 113 locked in the boss 106 is extended by a teat placed in a groove 114 of the head 109, so that the stroke of this bolt is limited to two positions for which the end of the rod 108 is jutting out (or not) in the part 97. In the bolted position, the head 109 is controlled, against the action of the spring 110, by an eccentric 115 integral with a rod 116 guided in the lid 23 and provided with a small lever 117 similar to that 82 previously described.

The heating mechanisms 7 are mounted in the parts 97 and bushings 103 in a tight-fitting manner so that the axial hole, that they delimit for the flow of heating gas, is in exclusive communication with the lower internal cavity 118 of the part 97. Each tubular bushing 85 and the corresponding bearing 86 are drilled with a hole 119 emerging in an annular chamber 120 delimited by the part 97 and the bearing 86, this chamber communicating with the cavity 118 by means of holes 121 drilled in said part 97. A gas pipe ferrule (not shown) is mounted in the hole 119.

As can be partially seen in FIGURES 4 and 6, one of the ends of the shaft 91 is made integral by any suitable means with a cam 122, which, during the rotation of the shaft, causes the displacement of a roller 123 controlling a valve 124 controlling the opening and closing of the gas delivery of the channels already mentioned.

The motor unit operates as follows:

The double-acting jack 29 is fed by a distributor (not shown), driven according to a programme drawn up in advance for each particular soldering to be effected. During a complete cycle, the piston 30 makes an outward stroke in the direction of the arrow $F_1$ from the position shown in FIGURE 5, a stop corresponding to the duration of the soldering operation, a return stroke and stop corresponding to the handling of the parts to be soldered.

During the outward stroke of the piston 30 (i.e., in the direction of the arrow $F_1$) the shaft 35 is rotatively driven in the direction of the arrow $F_2$ (FIGURE 3) by means of the pinion 34 meshing with the rack 33. The plates 36 and 37, integral with this shaft, transmit only part of the rotation to the free wheel 39. This latter drives the pinion 52 integral with the shaft 53 which revolves in the direction of the arrow $F_3$ (FIGURE 3), so that the milled wheel 25 integral with this shaft and the milled wheel 26 integral with the shaft 63 driven by means of gears 61 and 62 revolve in the opposite direction for carrying upwards a length of wire equivalent to the circumferential development of the rotation of these milled wheels.

Moreover, the racks 94 and 98 of this jack rotatively drive, on the one hand, in the direction of the arrow $F_4$ (FIGURE 5) the teeth 99 of the tubular parts 97, and on the other, in the direction of the arrow $F_5$ (FIGURE 3) the driving pinion 92 integral with the counter-shaft 91 which, by means of driven pinions 93 and racks 102 causes the bushings 103 to slide in the direction of the arrow $F_6$.

During the stop at the end of the outward stroke of the piston 30, the cam 122 acting on the roller 123 causes the valve 124 to open, so that the heating gas is delivered in a large quantity.

During the return stroke of the piston 30 (in the opposite direction to the arrow $F_1$) the pinion 34 revolves in an opposite direction driving the plates 36 and 37, and hence, the hub 38 of the free wheel 39 which, in this direction, cannot actuate the pinion 52. The milled wheels 25 and 26 remain motionless and the solder wire is not drawn along. Furthermore, the teeth 99 and driving pinion 92 revolve in the opposite direction so that the tubular part 97 pivots in the opposite direction to the arrow $F_4$ and the bushing 103 slides in the opposite direction to the arrow $F_6$.

During the stop corresponding to the end of the return stroke, the various elements of this unit remain motionless so as to carry out the handling of the parts for soldering and, eventually, to synchronize the activity of this unit with that of other work sets.

Figure 9:
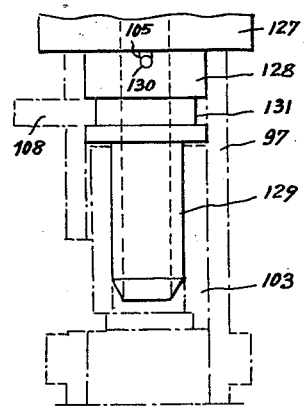
FIGURES 9 and 10 are partial views on a larger scale showing special embodiment details.
Figure 11:
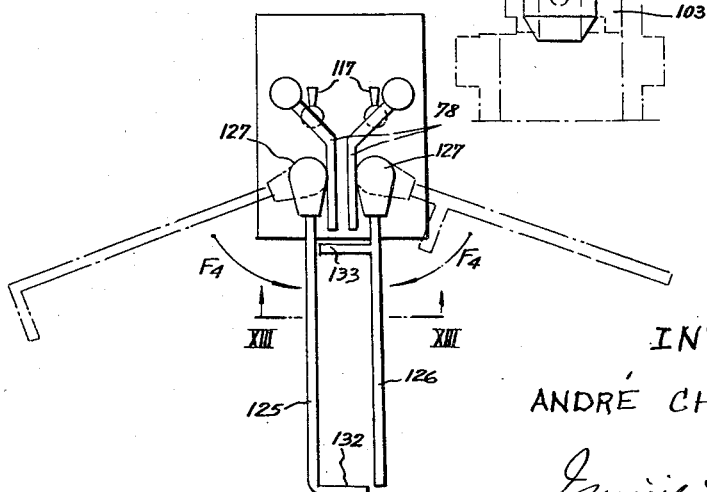
FIGURES 11 and 12 are diagrammatical plane views given on a smaller scale showing other embodiment details.

FIGURE 11 is a diagrammatical view of a pivoting heating mechanism. This mechanism comprises two heating rows 125 and 126 mounted in hollow supports 127 extended at their lower part (FIGURE 9) by a spindle 128 and stem 129 respectively engaged in the part 97 and bushing 103 that correspond. The spindle 128 is provided with a spur 130 placed in the notch 105 of the part 97 so as to rotatively integralize the support 127 with said part 97. The end of the rod 108 of the bolt 107 is engaged in a groove 131 made in the spindle 128.

Figure 13:
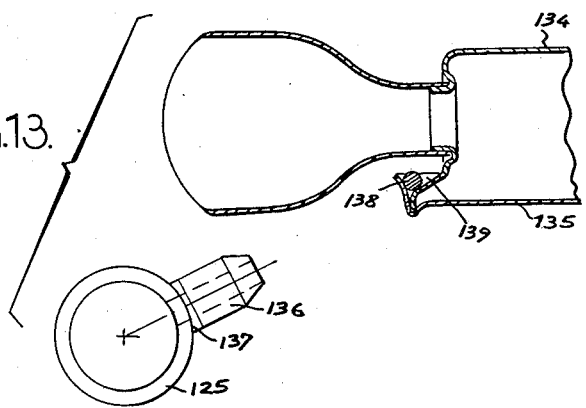
FIGURE 13 is a cross-section taken along the line XIII—XIII of FIGURE 11.

The heating rows 125 and 126 comprise, in this example of embodiment, two appendices 132 and 133 derived respectively on the end of the row 125 and at the beginning of the row 126 in order to effect uniform heating on the rectangular periphery of a water box 134 for soldering on a collector 135 (FIGURE 13). Burners 136 are screwed from point to point on a flat plate 137 carried on a generatrice of the heating rows 125 and 126.

The solder wire 138 (FIGURE 13) distributed by each set of milled wheels 25 and 26, runs through the corresponding tubular guide 78 which is bent (FIGURE 11) so that at its exit the wire can be guided by longitudinal lips provided for this purpose on the water box 134 and on the collector 135 delimiting a channel 139. During the distributing of the wire, the rows 125 and 126 leave the resting position, shown in dotted lines in FIGURE 11, to pivot in the direction of the arrows $F_4$ towards the soldering position shown by solid lines.

The gas delivered through the valve 124, during the soldering stage, escapes by the burners 136 to cause the wire 138 to melt that is supported by the water box 134 and collector 135 through the latter. The surface tension of the melted solder is such that it spreads as much in the longitudinal channels 139 as in the lateral channels (not visible) whose temperature is at least the same as the preceding ones. During the remainder of the cycle, the valve 124 is closed, but a leak is purposely created to supply a by-pass for lighting the rows 125 and 126.

Figure 14:
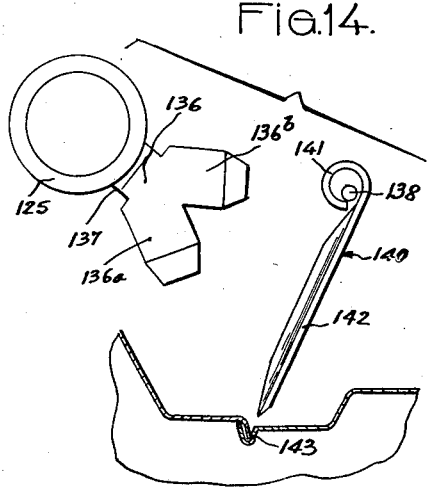
FIGURE 14 is a view similar to FIGURE 13 showing an alternative embodiment.

If the articles to be soldered have a sinuous shape, the solder wire 138 coming from the tubular guides 78 penetrates into a section 140 incurved like the parts (FIGURE 14). At its top part, this section comprises an open tube 141 supporting the wire 138 in the solid state for shaping it, one of the lips of this tube being prolonged by a spout 142 advantageously corrugated whose edge is placed above the zone 143 common to both parts to be soldered. The burners 136 mounted on the rows 125 and 126 are double, so that certain nose-pieces 136a of these burners heat the parts to be soldered and that the others 136b cause the wire 138 to melt across the tube 141, the melted solder running along the spout 142 and falling into the zone 143 where it distributes itself by capillarity between the parts for soldering.

Figure 10:
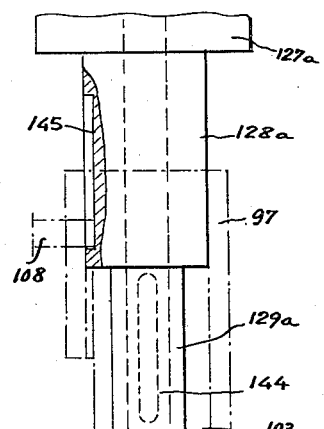
Figure 12:
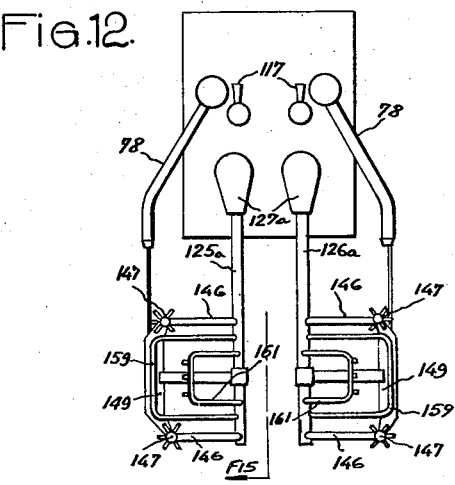

FIGURE 12 is a diagrammatical view of a sliding heating mechanism. This mechanism comprises two rows of burners 125a and 126a mounted in hollow supports 127a shown in detail in FIGURE 10. Each support 127a is prolonged by a spindle 128a and a stem 129a respectively engaged in the part 97 and the bushing 103. The stem 129a is provided with a key 144 mounted in the keying groove 104 of the bushing 103, the end of the rod 108 of the securing bolt 107 being arranged in a groove 145 made in the spindle 128a.

Appendices 146 are derived on the rows of burners 125a and 126a for supplying the burners 147 for heating the zone for soldering the parts. As can be particularly seen in FIGURE 15, these burners 147 are provided with nose-pieces 148 arranged like a star and bent so as to concentrate the heating power on this zone shaped like a crown, in the particular case of this example.

The wire 138 emerging from each of the tubular guides 78 (FIGURES 12, 15 and 16) penetrates into a melting-pot 149 placed at a slight slope to the vertical and supported by the corresponding burner row (125a for example) by means of a stem 150 fixed in a strap 151 soldered on to this row. The melting-pot 149 comprises two lateral cheeks 152 and 153 delimiting two sloping ramps 154 and 155 between them which are prolonged inside two distributing spouts 156 and 157 integral with the cheeks, these sloping ramps being directed to a point of the annular soldering zone.

Furthermore, burners 158 are carried on a ramp 159 cutting the solder wire by melting derived on each ramp 125a or 126a and so conformed that the emerging flame rays are directed on to the wire 138. A heating row 161 for the melting-pot 149 provided with burners 160 is derived on each row 125a or 126a and so shaped that the jet of the burners 160 is directed on to said melting-pot 149.

This sliding heating mechanism operates in the following manner: the fixed tubular guides 78 of the solder wire are in the position shown in FIGURE 15 and the rows of burners 125a and 126a in the top position. During the outward stroke of the piston 30, the solder wire 138 delivered penetrates into the melting-pots 149 while the supports 127a of the rows 125a and 126a supporting these melting-pots descend down to the position shown in FIGURE 15. During these relative displacements, the solder wire cannot engage the sloping ramp 154. The wire placed in each melting-pot heats up during the outward stroke because the melting-pots form thermic fly-wheels continually exchanging heat. When the outward stroke stops, the heating gas is delivered into the burners 147 and the ramps 159 and 161 so that the parts are heated, that the cutting by melting of the solder wire is effected and the melting-pot 149 kept at a temperature suitable for facilitating the flow of the liquid solder along the ramps 154. The liquid solder falls at a point of the zone for soldering the parts and spreads over the whole zone which has been previously pickled.

I claim:

1. An automatic soldering device comprising at least one set of milled wheels for feeding solder, a meshing pinion arrangement connecting said milled wheels for rotation in opposite directions, means to rotatably drive each set of milled wheels including a coupling member, said coupling member including means for driving each of said milled wheels in one direction only and adjustable means to regulate the angle through which said milled wheels are driven, a shaft carrying and driving said coupling member, a driving element having a reciprocating motion, a gear means engaged by the driving element and connected to rotate said shaft, a set of pinions simultaneously driven by said driving element, at least one axially guided sleeve provided with a toothed part meshing with one of said pinions to be moved back and forth in one direction, a first heating element releasably securable to said sleeve to be moved in time relation with said milled wheels feeding the solder, at least one rotatably mounted tubular part provided with a toothed part in engagement with said driving element for rotation of said tubular part, and a second heating element releasably mountable in said tubular part when the first heating element is removed from the sleeve and to be moved in time relation with said milled wheels feeding the solder.

2. An automatic soldering device comprising at least one pair of milled wheels tangentially disposed to co-operate for feeding a length of solder, a driving shaft carrying one of said milled wheels and a driven shaft carrying the other milled wheel, meshing gears carried by said shafts for rotatably connecting the shafts to turn in opposite directions, a driving pinion keyed to said driving shaft, a free wheel provided with a driven toothed portion meshing with said pinion, driving means for said free wheel so constructed and arranged as to always drive said toothed portion in the same direction, a hand operated regulating and coupling means to vary the extent to which said toothed portion of the free wheel is moved by said driving means whereby to regulate the angle of movement of said milled wheels feeding the solder, a driving jack having a reciprocal motion of constant amplitude and a set of rack portions one of which is connected to said driving means for said free wheel, a set of pinions simultaneously driven by another rack portion of the jack, axially guided sleeves each provided with a toothed part meshing with one of said pinions to be moved axially back and forth in one direction, a first set of heating elements releasably securable to said sleeves to be moved in time relation with said milled wheels feeding the solder, a rotatably mounted tubular part coaxially disposed with respect to each of said sleeves and provided with toothed elements meshing with still another rack portion of said jack for rotating the tubular parts, and a second set of heating elements releasably mountable in said tubular part when the first set of heating elements is removed from the sleeves and to be turned in time relation with said milled wheels feeding the solder.

3. An automatic soldering device comprising at least one set of milled wheels for feeding solder, a meshing pinion arrangement connecting said milled wheels for rotation in opposite directions, means to rotatably drive each set of milled wheels including a coupling member, said coupling member including means for driving each of said milled wheels in one direction only and adjustable means to regulate the angle through which said milled wheels are driven, a shaft carrying and driving said coupling member, a driving element having a reciprocating motion, a gear means engaged by the driving element and connected to rotate said shaft, a set of pinions simultaneously driven by said driving element, axially guided sleeves each defining a central channel for conveying a combustible gas and provided with a toothed part meshing with one of said pinions to be reciprocated thereby, a first set of heating elements releasably securable to said sleeves to be moved in time relation with said milled wheels, said heating elements each comprising a hollow frame communicating with one of said sleeve channels and having burners for heating a part to be soldered and a melting pot into which the solder is fed by said milled wheels, said melting pot having a gutter for delivering melted solder to the part to be soldered, rotatably mounted tubular parts provided with toothed elements in driven engagement with said driving element, and a second set of heating elements releasably mountable in said tubular part when the first set of heating elements is removed from the sleeves and to be turned by said tubular parts in time relation with said milled wheels feeding the solder.

4. An automatic soldering device as set forth in claim 3 comprising further a control cam operatively associated with said pinions driven by said driving element, a valve controlled by said cam for delivering and shutting off combustible gas and opened and closed in time relation with said milled wheels feeding the solder, and means for connecting said valve to said channels of the sleeves.

References Cited in the file of this patent

UNITED STATES PATENTS

| | | |
|---|---|---|
| 1,794,733 | Regenstreif | Mar. 31, 1931 |
| 2,282,945 | Demarest et al. | May 12, 1942 |
| 2,324,973 | Young | July 20, 1943 |
| 2,685,268 | Yeo et al. | Aug. 3, 1954 |
| 2,891,661 | Woods et al. | June 23, 1959 |
| 2,904,872 | Kingsbury | Sept. 22, 1959 |
| 3,045,619 | Grillon et al. | July 24, 1962 |